United States Patent [19]

Schiffer

[11] 4,349,588

[45] Sep. 14, 1982

[54] SIMULATED BRICK OR TILE

[76] Inventor: Henry Schiffer, 21835 Elbosque Way, Boca Raton, Fla. 33433

[21] Appl. No.: 299,722

[22] Filed: Sep. 8, 1981

[51] Int. Cl.[3] .......................... B05D 1/00; B05D 3/12; B05D 1/38; B32B 13/12

[52] U.S. Cl. .................................... 427/230; 427/270; 427/403

[58] Field of Search ......................... 427/230, 270, 403

[56] References Cited

U.S. PATENT DOCUMENTS

| | | | |
|---|---|---|---|
| 1,815,608 | 7/1931 | Birdsall | 264/138 X |
| 2,595,142 | 4/1952 | Herck | 156/71 X |
| 2,602,232 | 7/1952 | Keast | 156/62 X |
| 2,660,217 | 11/1953 | Lawson | 118/101 X |
| 2,748,443 | 6/1956 | Dufford | 264/33 |
| 2,819,495 | 1/1958 | Krausz | 264/256 X |
| 3,177,279 | 4/1965 | Bilodeau | 264/309 X |
| 3,882,218 | 5/1975 | Bixel | 264/321 X |
| 4,080,767 | 3/1978 | Wilhelm | 52/453 X |
| 4,271,111 | 6/1981 | Sheber | 264/293 X |

*Primary Examiner*—James R. Hoffman
*Attorney, Agent, or Firm*—Joseph Zallen

[57] ABSTRACT

A method for making simulated brick or tile wall or floor using cement, water-based adhesive and water-insoluble powdered pigment. The mixture is applied and then partially set. Scoring indentations are made to remove cement. After being completely set, mortar is placed in the indentations as a grout and allowed to set. The final step is a clear water-resistant coating on the entire surface.

3 Claims, 1 Drawing Figure

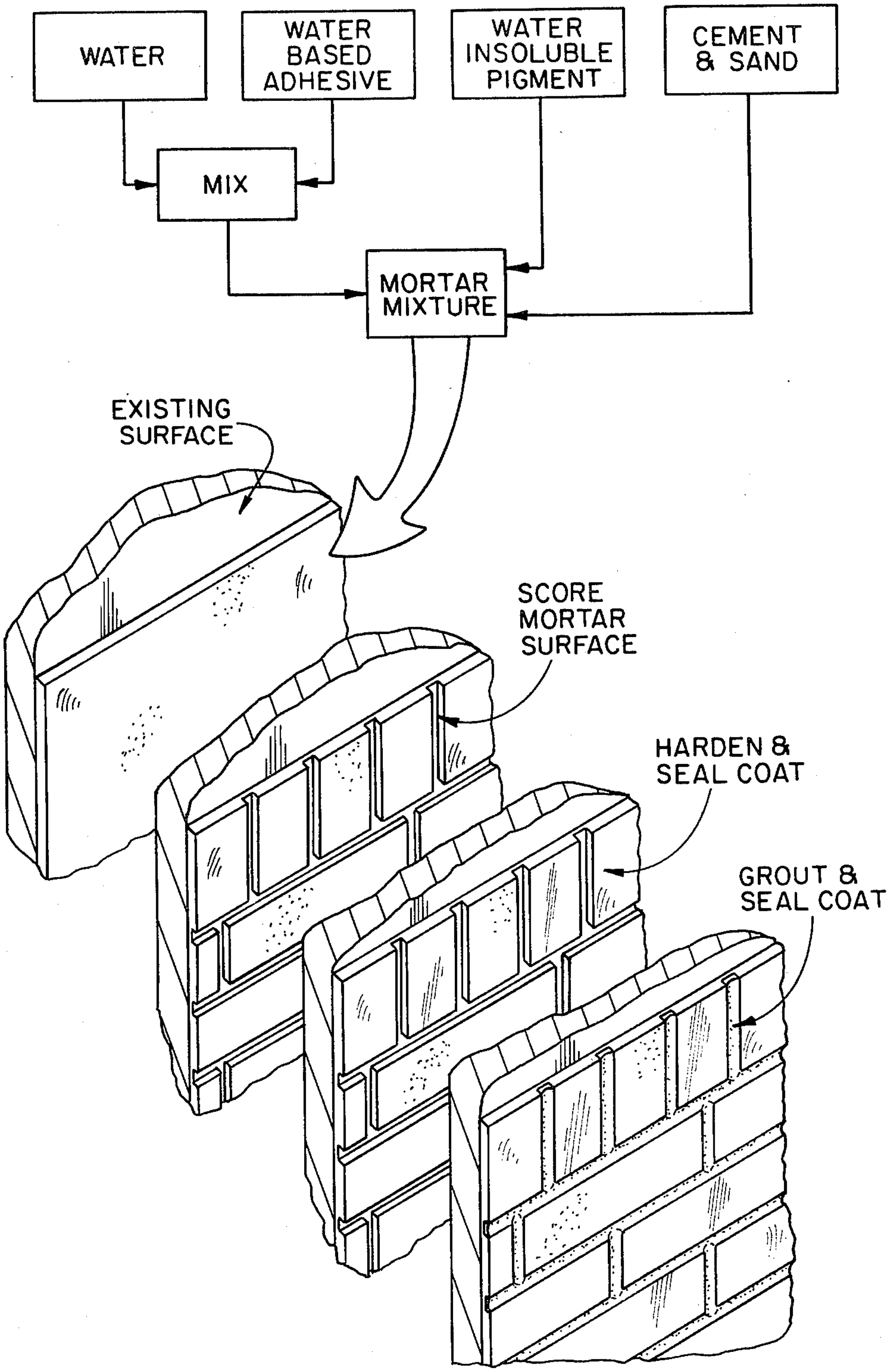
WATER
WATER BASED ADHESIVE
WATER INSOLUBLE PIGMENT
CEMENT & SAND
MIX
MORTAR MIXTURE
EXISTING SURFACE
SCORE MORTAR SURFACE
HARDEN & SEAL COAT
GROUT & SEAL COAT

SIMULATED BRICK OR TILE

BACKGROUND OF INVENTION

This invention relates to simulated brick or tile.

Because of the exceedingly high cost of labor, the use of genuine brick or tile in building has become prohibitively expensive. The prior art describes a number of methods for producing simulated brick or tile as for example U.S. Pat. Nos. 1,815,608, 2,595,142, 2,602,232, 2,660,217, 2,748,443, 2,819,495, 3,177,279, 3,882,218, 4,080,767, 4,271,111. However, none of the prior art provides a commercially feasible method for making simulated brick or tile which will have the durability and appearance of the genuine product.

One object of the present invention is to provide a novel method for providing simulated brick or tile which is commercially feasible and which has the durability of the genuine product.

Other objects and advantages of this invention will be apparent from the description and claims which follow taken together with the appended drawings.

SUMMARY OF INVENTION

The process of this invention comprises first forming a water slurry of cement with a miscible water-based adhesive having the characteristic of being normally adherent to the wall or floor being covered. The cement can include sand and/or aggregate. Appropriate powdered pigment is also mixed in at this stage. After the cement, adhesive and pigments have been thoroughly mixed, the mixture is applied to the floor or wall surface with a trowel or similar tool and the surface made smooth or rough as desired. The applied mixture is permitted to partially set but not dry. Then, indentations are scored on the surface in the appropriate design whereby the mixture is removed from those indentations. After the mixture has set and dried, it is preferred that a clear water-resistant coating such as a polyurethene coating be applied so as to seal the entire surface including the indentations.

Mortar is then applied as grouting into the indentations and allowed to dry. Superfluous mortar can be readily washed off, particularly if the water-resistant coating had been used. After the mortar has set and dried, a second coat of clear water-resistant coating such as polyurethene, is applied to the entire surface including the grouted indentations.

This method is suitable for use with all wall or floor surfaces and provides an inexpensive method of obtaining simulated brick or tile walls or floors of good durability and genuine appearance.

SPECIFIC EXAMPLE OF INVENTION

A cement mixture for use in making a simulated brick wall is prepared by mixing together water and water-based adhesive in the proportion of one gallon of water with one gallon of a water-based adhesive having 50% solids, as for example, a polyvinyl acetate latex adhesive. Such adhesives are commercially available. To five gallons of this mixture are added approximately 100 pounds of dry cement mix comprising three parts sand and one part Portland cement. The amount of cement mix is adjusted to form a mortar than can be suitably spread. Powdered pigment is mixed in with the dry cement powder to give the desired color. The mixture is then applied to a desired depth (e.g. $\frac{1}{8}$ to 1 inch, as a coating to any wall or floor surface in a new or existing construction, such as sheet rock, plywood or plaster, painted or unpainted, exterior or interior wall with a trowel. The applied coating is then permitted to partially set. Scoring is then done with an appropriate tool to remove coating in a pattern of indentations resembling bricks. The coating with the indentations is permitted to set up completely and harden. Then, a clear water-resistant sealing coating, such as a polyurethene solution is applied to the entire surface. After the sealing coat has dried, mortar is applied in the indentations as a grout. The entire surface is sealed with clear water-resistant coating.

BRIEF DESCRIPTION OF THE DRAWING

The steps of this method are shown in the drawing which illustrates the steps of the process.

I claim:

1. A method for making a simulated brick or tile wall or floor comprising:

(a) Providing a mixture of cement, water and water-based adhesive of the consistency of mortar;

(b) Applying the mixture to a wall or floor and permitting it to partially set;

(c) Scoring indentations in a selected design on the partially set applied mixture and removing the cement from the indentations.

(d) Permitting the applied mixture to completely set;

(e) Applying mortar into the indentations as a grout and allowing it to set; and (f) Applying a further clear water-resistant coating to the entire surface of the applied mixture.

2. The method of claim 1 wherein water-insoluble powdered pigment of the desired color is included in the initial mixture of cement, water and water-based adhesive.

3. The method of claim 1 or 2 wherein a clear, water-resistant coating is applied to the entire surface of the applied mixture after it has completely set, before applying the grout.

* * * * *